E. W. ARMSTRONG.
SHOVEL.
APPLICATION FILED JULY 5, 1912.
1,162,845.
Patented Dec. 7, 1915.
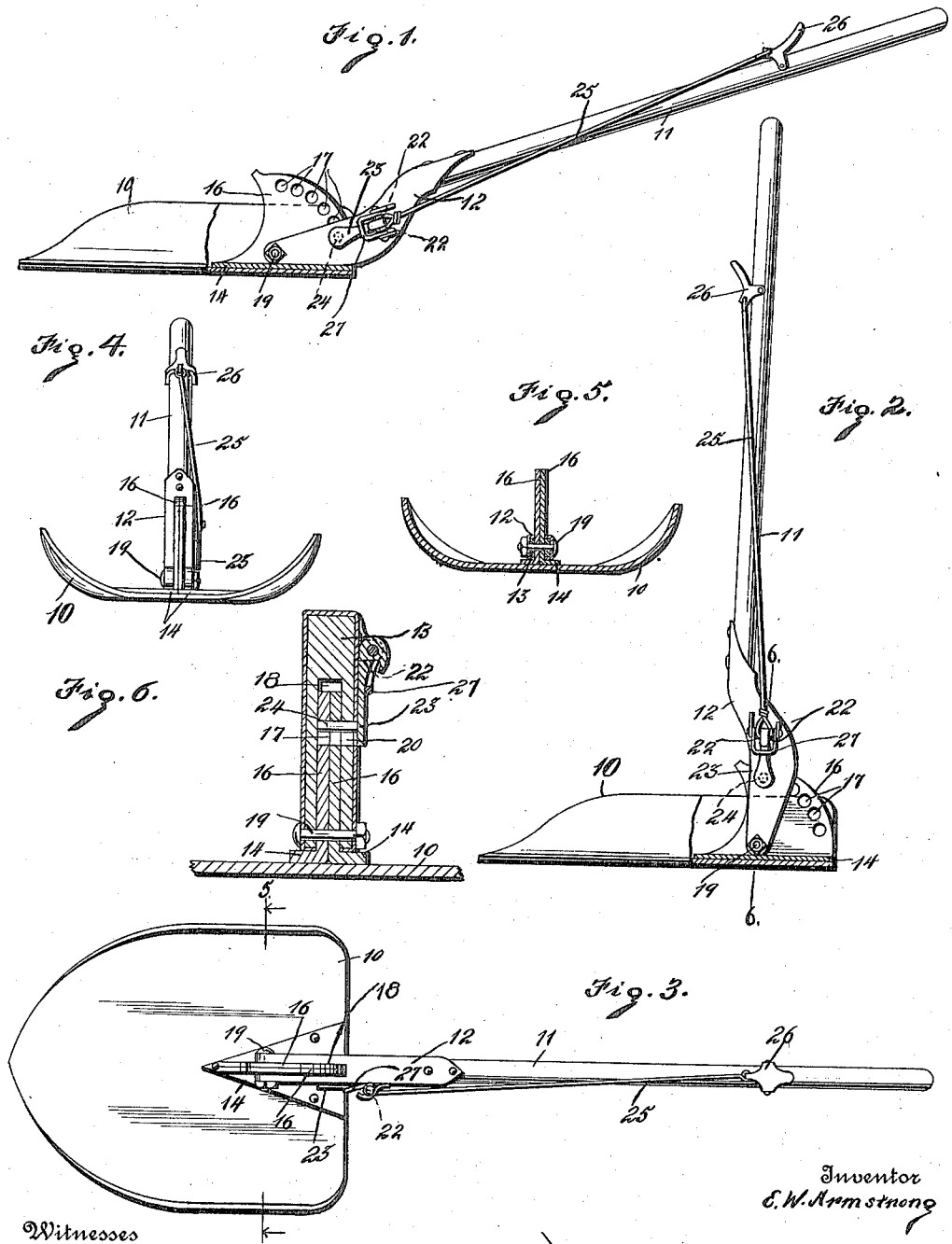
Witnesses
Inventor
E. W. Armstrong
By
Attorneys

UNITED STATES PATENT OFFICE.

EARL W. ARMSTRONG, OF PITTSFORD, NEW YORK.

SHOVEL.

1,162,845.  Specification of Letters Patent.  Patented Dec. 7, 1915.

Application filed July 5, 1912. Serial No. 707,933.

*To all whom it may concern:*

Be it known that I, EARL W. ARMSTRONG, a citizen of the United States, residing at Pittsford, in the county of Monroe, State of New York, have invented certain new and useful Improvements in Shovels; and I do hereby declare the following to be a full, clear, and exact description of the invention, such as will enable others skilled in the art to which it appertains to make and use the same.

This invention relates to improvements in shovels and has for its object to provide an article of manufacture having such structural features as will permit of manufacture on economical basis.

Other objects and advantages will be apparent from the following description and with particular reference to the accompanying drawings.

In the drawings: Figure 1 is a side elevation of a shovel made in accordance with my invention, Fig. 2 is a similar view showing the shovel adjusted into position for removing dirt from a post hole, Fig. 3 is a plan view of the shovel, Fig. 4 is a front elevation thereof, Fig. 5 is a vertical transverse section on the line 5—5 of Fig. 3, Fig. 6 is a transverse section on the line 6—6 of Fig. 2.

Referring to the drawings, there is illustrated a shovel including a blade 10 and a handle 11, the lower end of which is bifurcated as illustrated at 18 in Fig. 6 and over this bifurcated portion is provided a metal sheathing plate including a sleeve 12 which engages the lower end portion 13 of the handle and the spaced legs illustrated. Upon the blade 10 is secured a pair of angle irons arranged with corresponding flanges 16 in mutual contact and with the remaining flanges 14 secured upon the upper face of the shovel blade longitudinally thereof, whereby the flanges 16 extend away from the shovel blade. The flanges 16 have registering perforations in their forward portions through which is engaged a pivot bolt 19 which bolt engages also through registering perforations in the legs of the sheathing plate and the bifurcations of the lower end of the handle so as to afford a pivotal connection between the handle and the flanges 16. The flanges 16 have also registering perforations arranged in an arc shaped series in the upper rear portions of the flanges, the arc of the series being concentric with the pivot bolt 19.

Formed through one of the bifurcations of the handle is a perforation 20 which registers with a corresponding perforation in the corresponding leg of the sheathing plate and is adapted to register with the perforations 17 successively. Upon said leg of the sheathing plate are formed upstanding ears 22 between which is pivoted an arm 23 carrying a pin 24 which lies in the perforation 20 and is adapted to engage the perforations 17 interchangeably. Connected to the pivoted arm 23 and extending along the handle to the opposite end is a wire 25 provided with a hand grip 26. The pivot of the arm 23 has a coil spring 27 that normally holds the pin 24 in engagement with a perforation 17.

In the use of the device the handle may be set in the position indicated in Fig. 1 when the shovel may be used for ordinary digging purposes. When the hole increases in depth, the handle may be shifted with respect to the shovel blade in the position shown in Fig. 2 of the drawings to facilitate removal of dirt from the hole. The series of perforations permits of setting of the handle at various angles to the shovel blade.

What is claimed is:

As an article of manufacture, an adjustable shovel comprising a blade, a pair of angle irons arranged with corresponding flanges in mutual contact and with the remaining flanges secured upon the rear portion of the upper face of the blade longitudinally thereof, whereby the first named portions of the angle irons extend away from the shovel blade, said contacting flanges having registering perforations in their forward portions adjacent to the blade and an arc shaped series of perforations concentric with the first named perforations, a pivot pin engaged through said registering perforations, a plate bent upon itself and straddling the perforated flanges of the angle irons and pivoted upon said pivot, means carried by said plate for engagement with the arc shaped series of perforations interchangeably, and a handle secured within the bend of said plate.

In testimony whereof, I affix my signature, in presence of two witnesses.

EARL W. ARMSTRONG.

Witnesses:
WALTER A. ECKLES,
WALLACE A. HABECKER.

Copies of this patent may be obtained for five cents each, by addressing the "Commissioner of Patents, Washington, D. C."